United States Patent
Pellmann et al.

(10) Patent No.: US 9,616,488 B2
(45) Date of Patent: Apr. 11, 2017

(54) METHOD FOR PRODUCING STRUCTURAL COMPONENTS AND CHASSIS COMPONENTS BY HOT FORMING, AND HEATING STATION

(75) Inventors: Markus Pellmann, Sassenberg (DE); Frank Stelzer, Büren (DE); Franz-Josef Lenze, Lennestadt (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 248 days.

(21) Appl. No.: 14/345,153

(22) PCT Filed: Sep. 10, 2012

(86) PCT No.: PCT/DE2012/100274
§ 371 (c)(1),
(2), (4) Date: Mar. 14, 2014

(87) PCT Pub. No.: WO2013/037362
PCT Pub. Date: Mar. 21, 2013

(65) Prior Publication Data
US 2015/0298199 A1    Oct. 22, 2015

(30) Foreign Application Priority Data
Sep. 16, 2011  (DE) .................. 10 2011 053 698

(51) Int. Cl.
*B21K 7/12* (2006.01)
*B21J 5/06* (2006.01)
(Continued)

(52) U.S. Cl.
CPC ...... *B21K 7/12* (2013.01); *B21J 1/06* (2013.01); *B21J 5/06* (2013.01); *C21D 1/52* (2013.01);
(Continued)

(58) Field of Classification Search
CPC ... B21J 1/06; C21D 1/52; C21D 1/673; C21D 8/0221; C21D 8/0247; C21D 8/0294;
(Continued)

(56) References Cited

U.S. PATENT DOCUMENTS

| 5,456,773 A | 10/1995 | Bittner et al. |
| 8,511,744 B2 | 8/2013 | Pellmann et al. |

(Continued)

FOREIGN PATENT DOCUMENTS

| CN | 1693755 | 11/2005 |
| CN | 10118935 | 5/2008 |

(Continued)

OTHER PUBLICATIONS

International Search Report issued by the European Patent Office in International Application PCT/DE2012/100274 on Dec. 5, 2012.

*Primary Examiner* — Jessee Roe
*Assistant Examiner* — Jenny Wu
(74) *Attorney, Agent, or Firm* — Henry M. Feiereisen LLC

(57) ABSTRACT

In a method for producing in particular structural components or chassis components for a motor vehicle by hot or semi-hot forming, a sheet metal blank is heated in a heating station at least in a first region from a starting temperature to a target temperature, and then the warm blank is transferred to a cooled pressing tool and is formed and press-hardened. The heating station includes at least one burner zone which includes at least one burner, in which zone the sheet metal blank is heated from the starting temperature to the target temperature, and at least one burner is operated with a combustion gas and an oxygen-containing gas and the sheet metal blank comes into direct contact with the burner flame.

9 Claims, 4 Drawing Sheets

(51) Int. Cl.

| | | |
|---|---|---|
| *C22C 38/00* | (2006.01) | |
| *C21D 9/46* | (2006.01) | |
| *C23C 30/00* | (2006.01) | |
| *B21J 1/06* | (2006.01) | |
| *C21D 8/02* | (2006.01) | |
| *C21D 1/52* | (2006.01) | |
| *C21D 1/673* | (2006.01) | |
| *F27B 9/24* | (2006.01) | |
| *F27B 9/26* | (2006.01) | |
| *F27B 9/36* | (2006.01) | |
| *F27D 5/00* | (2006.01) | |
| *B62D 25/04* | (2006.01) | |

(52) U.S. Cl.
CPC ............ *C21D 1/673* (2013.01); *C21D 8/0221* (2013.01); *C21D 8/0247* (2013.01); *C21D 8/0294* (2013.01); *C21D 9/46* (2013.01); *C22C 38/00* (2013.01); *C23C 30/005* (2013.01); *F27B 9/24* (2013.01); *F27B 9/26* (2013.01); *F27B 9/36* (2013.01); *F27D 5/0006* (2013.01); *B62D 25/04* (2013.01)

(58) Field of Classification Search
CPC ....... C21D 9/46; C22C 38/00; C23C 30/0005; B21K 7/12
See application file for complete search history.

(56) References Cited

U.S. PATENT DOCUMENTS

| | | | |
|---|---|---|---|
| 2003/0099266 A1* | 5/2003 | Watanabe | H01S 5/02284 372/36 |
| 2007/0122756 A1 | 5/2007 | Wunning et al. | |
| 2009/0188591 A1 | 7/2009 | Eichelkrauth et al. | |
| 2009/0320968 A1* | 12/2009 | Boeke | C21D 1/185 148/546 |
| 2010/0132854 A1 | 6/2010 | Cola, Jr. | |
| 2010/0199737 A1 | 8/2010 | Pellmann et al. | |
| 2010/0300584 A1 | 12/2010 | Buschsieweke et al. | |
| 2011/0232354 A1 | 9/2011 | Hielscher et al. | |
| 2011/0232806 A1 | 9/2011 | Pellmann et al. | |
| 2011/0232808 A1 | 9/2011 | Pellmann et al. | |
| 2011/0233946 A1 | 9/2011 | Pellmann et al. | |
| 2011/0233966 A1 | 9/2011 | Pellmann et al. | |
| 2011/0233968 A1 | 9/2011 | Pellmann et al. | |
| 2011/0269086 A1 | 11/2011 | Frost | |
| 2011/0291431 A1 | 12/2011 | Buschsieweke et al. | |
| 2012/0006089 A1 | 1/2012 | Pohl et al. | |
| 2012/0090741 A1 | 4/2012 | Pellmann et al. | |
| 2012/0091758 A1 | 4/2012 | Zimmermann et al. | |
| 2012/0318415 A1 | 12/2012 | Zimmermann et al. | |

FOREIGN PATENT DOCUMENTS

| | | | | |
|---|---|---|---|---|
| CN | 101280352 | | 10/2008 | |
| CN | 101356290 | | 1/2009 | |
| CN | 101796202 | | 8/2010 | |
| CN | 102031456 | | 4/2011 | |
| CN | 102051457 | | 5/2011 | |
| CN | 102139326 | | 8/2011 | |
| DE | WO 2004018715 A2 * | 3/2004 | ............... C21D 1/18 |
| DE | 102004035276 | | 2/2006 | |
| DE | 102006005063 | | 8/2007 | |
| DE | 102007057855 | | 10/2008 | |
| DE | 102010004081 | | 3/2011 | |
| DE | 102009051157 | | 5/2011 | |
| EP | 1 816 219 | | 8/2007 | |
| EP | 2 090 667 | | 8/2009 | |
| EP | 2 335 984 | | 6/2011 | |
| EP | 2335984 | | 6/2011 | |
| JP | H09272919 | | 10/1921 | |
| JP | 2008214670 | | 9/2008 | |
| SE | WO 2007075138 A1 * | 7/2007 | ............... C21D 1/52 |
| WO | WO 93/20248 | | 10/1993 | |
| WO | WO 2007/075138 | | 7/2007 | |
| WO | WO 2010/089103 | | 8/2010 | |
| WO | WO 2011/071434 | | 6/2011 | |
| WO | WO 2011/126427 | | 10/2011 | |

* cited by examiner

METHOD FOR PRODUCING STRUCTURAL COMPONENTS AND CHASSIS COMPONENTS BY HOT FORMING, AND HEATING STATION

CROSS-REFERENCES TO RELATED APPLICATIONS

This application is the U.S. National Stage of International Application No. PCT/DE2012/100274, filed Sep. 10, 2012, which designated the United States and has been published as International Publication No. WO 2013/037362 and which claims the priority of German Patent Application, Serial No. 10 2011 053 698.1, filed Sep. 16, 2011, pursuant to 35 U.S.C. 119(a)-(d).

BACKGROUND OF THE INVENTION

The invention relates to a method for producing in particular structural or chassis components for a motor vehicle by hot or warm forming, wherein at least a first region of a sheet metal blank is heated in a heating station from a starting temperature to a target temperature and subsequently the hot blank is transferred into a cooled pressing tool where it is formed and press-hardened. The invention further relates to a heating station for use or application in the method.

For producing in particular structural and chassis components for vehicles, oftentimes sheet metal blanks are cut from a strip material, heated in a continuous furnace and subsequently hot formed into a formed component and press-hardened in a cooled pressing tool. This method is also known as direct hot forming. Besides this, indirect hot forming is common where a sheet metal blank is first cold formed and then heated before it is finally formed or configured in a cooled pressing tool and press-hardened. The heating of the sheet metal blank typically occurs in continuous furnaces, wherein indirect heating occurs via the heated air through heat radiation and convection. In a continuous furnace the sheet metal blank is to be heated under defined conditions. Depending on whether uncoated or coated starting materials are used, the heating parameters have to be adjusted.

DE 10 2010 004 081 B3 discloses a direct and indirect hot forming of steel for producing components of different ductility, wherein the blank or the pre-formed component is heated to a temperature smaller or equal to Ac1 and only certain regions are heated by oil or gas burners to greater or equal to Ac3 and the blank or the pre-formed component is subsequently press-hardened.

WO 93/20248 A1 discloses a multistep heating of thin metal parts in continuous furnaces; wherein heating is carried out to a pre-heating temperature under atmosphere up to 850° C. and then to final temperature in reduced (O2-free) atmosphere with upper and lower burners.

A disadvantage hereby is the long time required for the heating and as the case may be for the alloying of the pre-coating and the high space requirement of the continuous furnaces resulting therefrom in order to maintain pre-determined cycle times. As a result of the long heating time the re-crystallization or austenization of the starting material occurs in such a manner that a relatively coarse-grained microstructure is established, which is frozen into martensite in the subsequent press-hardening. This microstructure is disadvantageous with regard to the ductility of the finished component, which may be particularly important for crash relevant components.

DE 10 2006 005 063 A1 discloses a method for heat treating uncoated steel products in which a continuous furnace is equipped with burners whose flames are brought into direct contact with the steel products in order to enable a fast heating and on the other hand a pre-oxidation of the surface, which are required for subsequent coating steps. Different temperature zones and the oxygen content in the region of the strip surface are adjusted via the air number Lamda (supplied amount of oxygen relative to the amount of oxygen reacted during combustion) as burner parameter.

SUMMARY OF THE INVENTION

Based on the described state of the art, the object of the invention is to render the heating process of a sheet metal blank during production of structural and chassis components of vehicles faster, more space-efficient, and with this overall more economical.

This object is solved by a method for producing structural or chassis components for a motor vehicle by hot or warm forming, including: providing a heating station comprising at least one burner zone, said at least one burner zone comprising at least one burner; operating the at least one burner with a combustible gas and an oxygen containing gas to thereby generate a burner flame; heating at least a first region of a sheet metal blank in the at least one burner zone from a starting temperature to a target temperature by bringing the sheet metal blank into direct contact with the burner flame generated by the burner; transferring the hot blank into a cooled pressing tool; and forming and press hardening the sheet metal blank in the cooled pressing tool to a finished component, and by a heating station for use in a method for producing structural or chassis components for a motor vehicle by hot or warm forming, said heating station including at least one burner field, wherein the at least one burner field includes multiple burners arranged spaced apart at a distance to each other of greater than (>) 70 mm, the multiple burners being operable with a combustible gas and an oxygen containing gas to thereby generate a burner flame, the heating station being configured for heating at least a first region of a sheet metal blank in the at least one burner field from a starting temperature to a target temperature by direct contact of the sheet metal blank with the burner flame generated by the burner.

The invention is intended to enable producing a structural or chassis component for a vehicle, which compared to conventionally heat treated sheet metal blanks has improved mechanical properties and can be produced more cost-effectively.

According to the invention it is proposed to heat a sheet metal blank made of a metallic alloy in a heating station, which is arranged upstream of the heating process, from a starting temperature, preferably room temperature, to a target temperature. A first aspect of the invention provides that the target temperature essentially corresponds to the austenization temperature of the basic material of the sheet metal blank, i.e., the sheet metal blank is heated to greater than Ac3. For steel as basic material of the sheet metal blank a target temperature of about 930° C. results. The heating occurs at least in a first region of the blank, wherein this region preferably corresponds to the entire surface of the blank. A characterizing feature of the invention is that the heating station has a burner zone of at least one, in particular multiple spaced apart burners, which are operated with a combustible gas and an oxygen containing gas. The sheet metal blank has preferably already a contour which approximately corresponds to the dimensions of the formed component.

A characterizing feature of the invention is that the sheet metal blank is heated at a high rate and extremely high efficiency by the burners, by virtue of the fact that the blank is in direct contact with the burner flames, which turbulently flow onto the sheet metal blank and in particular envelop the entire circumference of the blank. This makes it possible to establish a very uniform temperature profile in the sheet metal blank and with this also uniform surface properties in the case of pre-coated material and a uniform microstructure transformation. This is in particular an advantage compared to the fast inductive heating by means heating coils, which are situated in close proximity to or on the sheet metal blank.

In particular the heating from the starting temperature to the target temperature occurs with a rate of at least 20K/s, in particular preferably greater than 50K/s, most preferably greater than 90K/s. At least in the temperature range between 600-800.degree. C. it is proposed according to the invention to heat the blank with maximal heating rate, because this temperature range is most prone to introduction of hydrogen into the basic material and this time period has to be kept as short as possible. Depending on the blank thickness the heating rate is preferably greater than 50K/s, most preferably greater than 100K/s, wherein a blank thicknesses between 0.7 and 15 mm can be used. Hydrogen embrittling in the finished component can thus be effectively avoided.

With regard to the component the temperature is the core temperature, i.e., the temperature which is established at least in a first region of the sheet metal blank essentially over the entire material thickness, wherein in particular for armor steel with a material thickness of significantly greater than 5 mm the heating rate is rather between 20 and 50K/s, while for a material thickness of less than 1 mm a heating rate of greater than 100K/s can be achieved.

Important for the invention is also to use a special gas mixture of a combustible gas, for example natural gas, and an oxygen-containing gas. The flame is the hotter or the heat flow density the greater the higher the oxygen content in the gas mixture is. Therefore in particular technical oxygen with greater than 75% oxygen content, in particular greater than 90% oxygen content is provided.

When using more oxygen than required for the combustion process, the non-reacted oxygen atoms can advantageously be used to at least partially bind the hydrogen which was introduced into the blank via the combustible gas. This in turn contributes to avoiding hydrogen embrittlement in the finished component.

Of course it can also be provided that at least one second region exists on the blank which is not or less strongly heated for example in a border region which is less intensely impacted by the burner flames. It is also possible however that the second region is heated to a temperature below Ac3 in a targeted manner in order to avoid a complete austenization of the material but still enable a sufficient hot forming in a press forming tool. In this way a greater ductility or a bainitic or ferritic microstructure or a mixed microstructure can be established in the second region.

Subsequent to the heating in the heating station the blank is transferred into a cooled press forming tool where the hot blank is formed and press-hardened.

Particularly advantageously the method according to the invention can be used when coated sheet metal blanks, in particular aluminum silicone pre-coated (Al—Si) steel sheets are used. In this case a synergistic effect occurs in that during the heating in the heating station at the same time at least a partial alloy layer forms on the surface of the sheet metal blank. Hereby the Al—Si layer transforms from inside to outside into an intermetallic iron aluminum silicone alloy layer due to diffusion processes, which occurs the faster the higher the temperature on the blank is. Compared to the state of the art this is especially advantageous because on one hand pre-alloyed sheet metal strips and blanks are currently still very expensive to acquire and are globally hardly available, and on the other hand Al—Si pre-coated but not pre-alloyed sheet metal blanks usually strongly lower the durability of the rolls in the continuous furnace in the direct hot forming. This prevents pre-alloying or through-alloying according to the invention in the heating station.

A further aspect of the invention provides to interpose a furnace heating, in particular in the continuous furnace, between the heating station and the press forming tool in order to completely alloy through the pre-coated sheet metal blank. Thereby, aluminum silicone phases which may still be present transform from inside to outside into the intermetallic iron aluminum silicone alloy layer. Contrary to the state of the art this intermediate step in the furnace is of short duration because the temperature does essentially not have to be increased but only a holding at the target temperature occurs in order to homogenize the already pre-alloyed sheet metal blank with regard to its surface coating. This allows significantly reducing the length of the continuous furnaces, which also allows lowering energy consumption and heat load in the production hall. In addition as a result of the at least pre-alloying achieved in the heating station in the case of pre-coated sheet metal blanks, wear on the rollers is significantly decreased.

It is also possible to perform the complete austenization of the sheet metal blank only during the intermediate step in the continuous furnace so that the target temperature in the heating station is set to less than Ac3 and in the continuous furnace greater than or equal to Ac3.

Prior to the transfer into a press forming tool or into the furnace which is arranged downstream of the heating station, the sheet metal blank is heated to the target temperature without being moved. In this regard, the burner field can be arranged movable and for example performs an oscillating movement parallel to the plane of the sheet metal blank. It is also possible that individual burners of the heating station can be adjusted in height or away from the sheet metal blank so that the burner field itself is only formed by the active burners that are not moved away from the blank.

Of course it can also be provided to move the blank itself with a defined movement pattern relative to the burner field, wherein however in most sheet metal blanks for structural and chassis components such a relative movement is not desired or not required. This also obviates a complicated control of individual burners to avoid idle operation and in particular to avoid damage in the case of opposing burner zones.

A further important aspect of the invention relates to a heating station for carrying out the above described method.

Here it is provided to configure the heating station in such a manner that multiple burners are arranged spaced apart within at least one burner field, wherein the distance between the burners is greater (>) than 30 mm, preferably >50 mm, particularly preferably >70 mm. This enables on one hand a sufficient safety distance for protection against mutual exposure to flames, in particular due to flames being deflected back from the sheet metal blank, on the other hand however also a sufficiently high heat flow density of 250 to 2000 KW/m2. However, a maximal distance of 150 mm should not be exceeded.

In an advantageous embodiment of the invention it is further provided that the nozzles of the burners of the at least one burner field are arranged at a distance to the sheet metal blank of >75 mm, preferably >100 mm, particularly preferably >170 mm. This distance ensures in particular a highly turbulent gas flow on the surface of the sheet metal blank and further serves for self protection. However, a maximal distance of 250 mm between the sheet metal blank and the burner should not be exceeded because otherwise excessive gas pressure would have to be built up or a wider nozzle would have to be used in order to generate a sufficiently wide flame.

Within the scope of the invention the stated distances of the burners to each other and to the sheet metal blank relate to the burner nozzles.

Particularly preferably for thicker sheet metal blanks, in particular armor sheet metal blanks, at least one burner field is arranged above the sheet metal blank and one burner field below the sheet metal blank in order to ensure maximal heat introduction and with this a maximal heating rate. Due to the different heat flow it can be provided that the distance of the burner nozzles of an upper burner field is smaller than the distance of the nozzles of a lower burner field. In the case of a vertical orientation of the sheet metal blank in the heating station it is of course also conceivable to arrange burner fields on the right hand side and the left hand side of the blank, wherein in this case it is useful to adjust the orientation of the burner nozzles to the shape of the blank at least border side. This may result in an altered distance of these burner nozzles compared to the overall burner field or in a different angle of attack relative to the sheet metal blank.

Particularly preferably, the heating station is configured compact so that the at least one sheet metal blank is heated to a target temperature in the heating station without being moved relative to the heating station, wherein the sheet metal blank is positioned in the heating station linearly, punctiform, in particular on a nail cushion or a grid. In this regard it is advantageous when the handling time for placing and removing the sheet metal blank is as short as possible and the heating station is not occupied by an excessive amount of time for this purpose. This can be achieved by not placing the sheet metal blank directly inside the furnace but rather to use a transport module for example in the manner of a slide-in drawer, which can be moved into and out of the heating station particularly fast. The sheet metal blank hereby directly rests on the transport module and is transported by the transport module into the heating station, heated therein and moved out of the heating station again. This improves the accessibility for a handling tool and with this the handling time itself can be decreased. In combination with a second transport module, which is operated in alternation with the first transport module, the capacity of the heating station with regard to the occupation time can be further improved. The second transport module can be arranged so as to be insertable or retrievable from the opposite side so that an alternating cycle between the transport modules results.

As already mentioned, under certain circumstances it is also possible and useful to establish a relative movement, preferably an oscillating movement, between the sheet metal blank and the burner field. When using one or multiple transport modules these can also provide for the movement during the heating.

For ensuring compliance with environmental and worker safety requirements it is further provided to discharge exhaust gases generated in the heating station, wherein this is preferably realized by suction or conduction to the outside. Filtering allows retaining components that are harmful to the environment, a flaring depending for example on the CO content is also possible in the continuous operation.

Particularly preferably the exhaust gas or the excess heat in the heating station can be used to pre-heat a downstream furnace, in particular a continuous furnace. For this, the exhaust gas can either be conducted through a heat exchanger and transferred to another medium or can be directly introduced into the downstream furnace.

The part of the invention relating to the device according to claim 13 relates to a structural or chassis component for a motor vehicle, which is produced according to the method described above and possesses a number of advantageous properties compared to similar components, which were produced conventionally.

On one hand a relatively fine-grained microstructure is established after the heating due to the very high heating rate. The reason for this is that in conventional heating in the continuous furnace over several minutes, the per se fine-grained microstructure is gradually transformed into a coarser structure, the stronger the longer the sheet metal blank remains in the furnace at increased temperature.

According to the invention in particular a higher ductility is achieved after the hot forming and press hardening at essentially unchanged strength of the finished component. At a preferred heating rate of on average >20K/s and a heating rate within the temperature range of 600 to 800° C. of >50K/s the ductility on the finished component is increased by more than 5% to 10% compared to a sheet metal component which was conventionally heated in the continuous furnaces—for example over a time period of 4 minutes. The increase of the ductility is the greater the shorter the heating time or the higher the heating rate is. Thus most preferably, ductility increases of >10% at a heating rate of >90K/s are possible.

The ductility can be determined by way of the bending angle by subjecting a sample of a component produced with the method according to the invention to a bending test. For this, a preferably flat sample is linearly floatingly placed onto two rollers, then a bending die with rounded punching region is moved centered toward the sample perpendicularly from above. Then the sample is bent linearly between the rollers up to a predefined force decrease threshold, wherein the path of the die as well as the force of the die are continuously recorded. Depending on the analysis method, a bending angle can be directly measured or can be calculated via a formula which takes the elastic spring back, the sheet thickness, the roller radius and further parameters into account. The increase of the ductility according to the invention is directly proportional to the thus determined bending angle.

The following example is based on a sheet metal blank made of boron alloyed steel of the type HC1000W with a sheet thickness of 2 mm, which was conventionally heated over 4 minutes in a continuous furnace and was completely austenized and subsequently hot formed and press hardened. Tests showed a tensile strength of 1300 MPa at a calculated bending angle of 52°. In contrast, for samples of identical geometry and made of the same material, which were produced according to the method according to the invention, an almost identical tensile strength of 1312 MPa at an increased bending angle of 59° was determined. This results in an increase of the ductility and the bending angle of approximately 13%.

Within the scope of the invention structural or chassis components for motor vehicles also include armoring parts, which function as defense against ballistic projectiles or detonations, however which at the same time or in addition serve as structural or chassis components.

BRIEF DESCRIPTION OF THE DRAWING

The invention is explained in more detail by way of the following Figures.

DETAILED DESCRIPTION OF PREFERRED EMBODIMENTS

Figure 1:
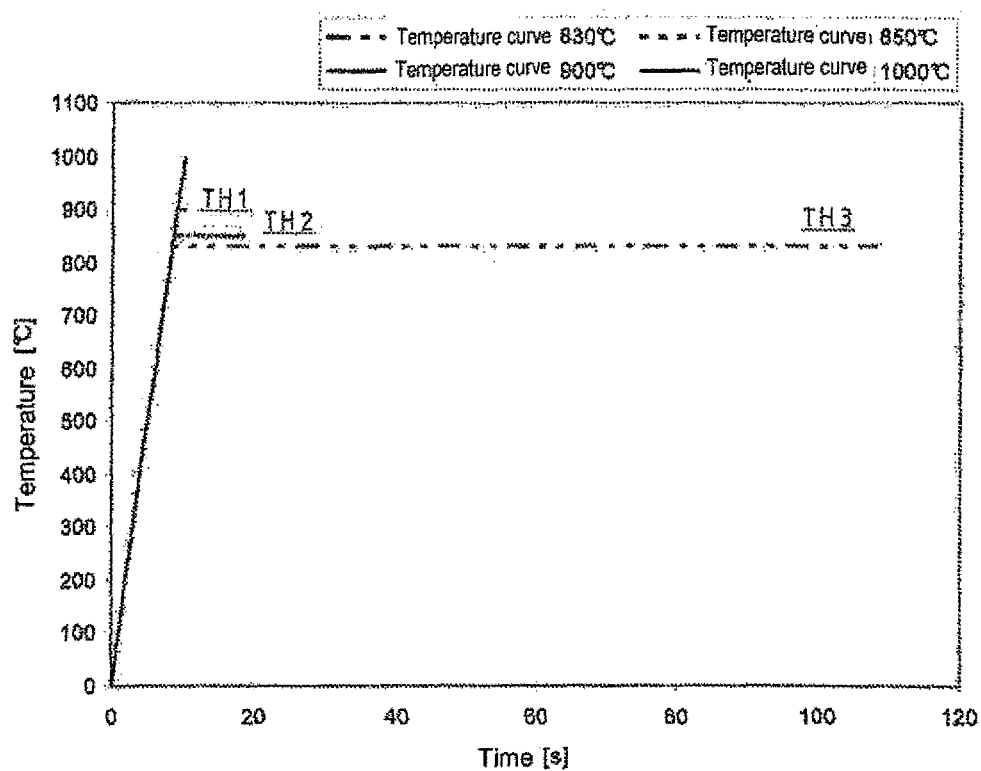
FIG. 1 a heating profile in the heating station according to the invention
Figure 2:
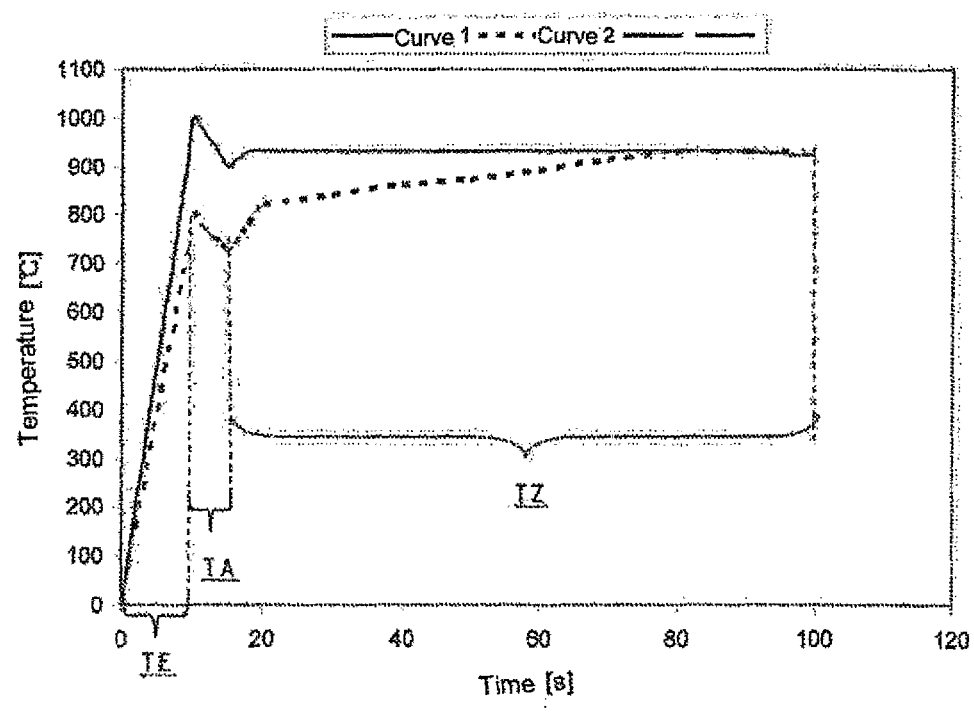
FIG. 2 a heating profile according to the method according to the invention

All temperatures stated in the description, in particular in FIGS. 1 and 2 respectively relate to the use of boron manganese steels, in particular 22MnB5 as basic material of the sheet metal blanks. The invention is however not limited thereto. Thus, armor steels such as aluminum alloys, aluminum alloys, in particular copper containing aluminum alloys, can be used, wherein in this case different heating temperatures for the hot or warm forming result.

The following values for the heating temperature can be assumed as guideline values:

Armor steel, for example according to DE102008010168B4 has a heating temperature of about 900-930° C.

Al—Zn—Mg alloy has a heating temperature of about 250-350° C.

FIG. 1 shows heating curves with different target temperatures. Curves 2 to 4 show two-step heating profiles in which after a fast heating time TE of about 10 seconds to a target temperature, a holding time TH follows which is the longer the smaller the target temperature was set. Towards the end of the holding time TH a respectively complete austenitic microstructure is present. It can be seen in curve 1 that this is also possible with a slight overheating without any holding time and occurs the fastest.

FIG. 2 shows the method sequence by way of two time-temperature curves, wherein curve 1 only differs from curve 1 of FIG. 1 in that a homogenization is carried out in an intermediate step in a short continuous furnace at >Ac3. An over heating of the sheet metal blank to about 1000° C., i.e. 70° C. above the Ac3 point of the alloy of the base material of the sheet metal blank, can be recognized.

Curve 2 in FIG. 2 shows in addition a slightly slower heating to a target temperature <Ac3 in the heating station and only in the intermediate step TZ a heating to above Ac3. This slower heating can be caused by a thicker sheet metal blank or by a burner zone with greater burner distance, lower oxygen content or impacting only one side of the sheet metal blank with flames.

In both curves a short drop time TA of the temperature after about 10 seconds is indicated, which is intended to illustrate the heat loss during transfer from the heating station into the downstream furnace. This heat loss can be minimized by tight coupling or integration of heating station and furnace.

Figure 3A:
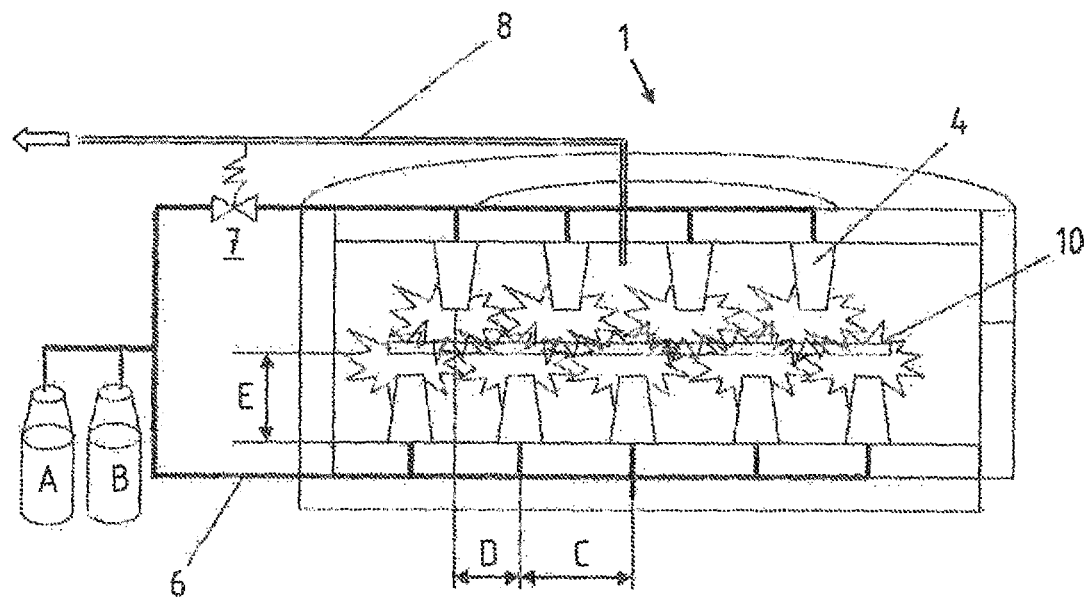
FIGS. 3a and 3b an embodiment of a heating station according to the invention in a sectional view FIG. 4 a transport module for the heating station according to the invention for placing a sheet metal blank FIG. 5 a schematic diagram for illustrating the method according to the invention FIG. 6 a schematic diagram of a sheet metal component produced according to the method according to the invention
Figure 3B:
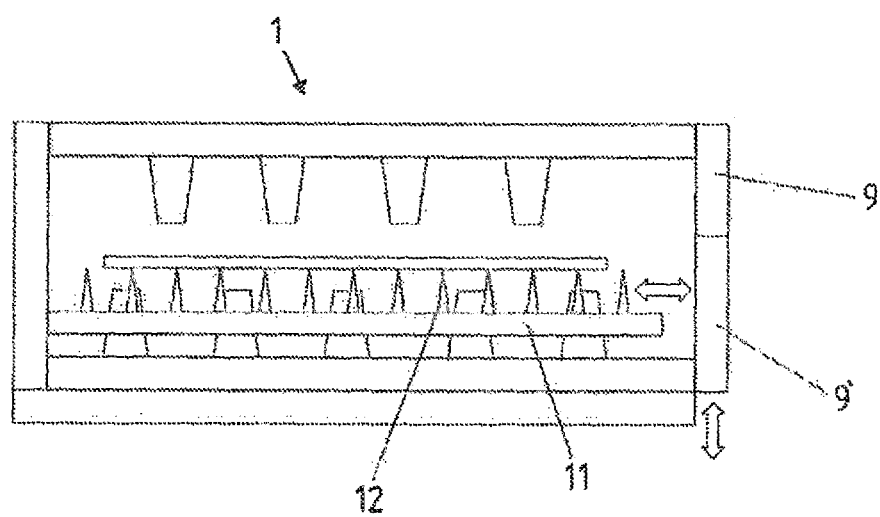

FIGS. 3a and 3b schematically show a sectional view onto the heating station 1 according to the invention with an upper burner zone 2 and a lower burner zone 3. The heating station is essentially formed by an upper and a lower burner zone 2, 3 between which the sheet metal blank 10 is arranged. Insulation means 9 serve for thermal insulation against the environment.

FIG. 3a differs from FIG. 3b only in that the support for the sheet metal blank is not shown, however, the delivery system for the burner gas and the oxygen-containing gas and an exhaust line is shown. In order to prevent a gas flashback and overpressure in the system, safety mechanisms, here indicated by a safety valve, are to be provided in the delivery system.

In FIG. 3b, the support of the sheet metal blank is exemplary realized as needle cushion 12, which can be moved into and out of the heating station 1 on a horizontally movable transport module 11. The transport module itself can be guided over rollers or rails. The insulation means is realized as movable bulkhead 9' on a wall, which is closed during the heating and only has to be opened during insertion or retrieval of the sheet metal blank. A further in particular opposing bulkhead is to be provided when a second transport module is used in the same heating station in an alternating cycle.

Figure 4:
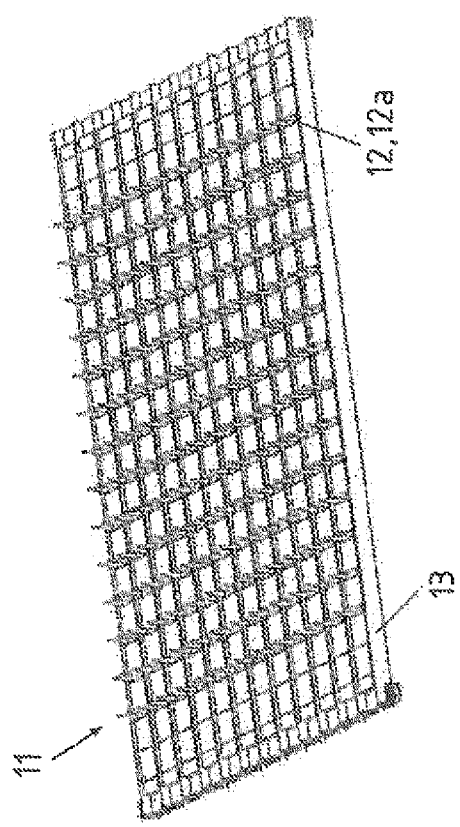

Finally, FIG. 4 shows an advantageous embodiment of receiving the sheet metal blank 10 during the heating. Multiple perpendicularly projecting needles 12a on a basic frame 13 can be recognized which form the needle cushion 12 and have a narrow and identical distance and an identical height and with this enable an essentially even support of the sheet metal blank 10 without blocking the burner flames 5 on the bottom side. Naturally the distance of the needless 12a to each other is to be selected the smaller, the thinner and with this the softer the sheet metal blank is in the heated state. Corresponding considerations apply of course to an alternative linear support of the sheet metal blank independent of the fact whether the support occurs directly in the heating station or in a transport module 11.

Figure 5:
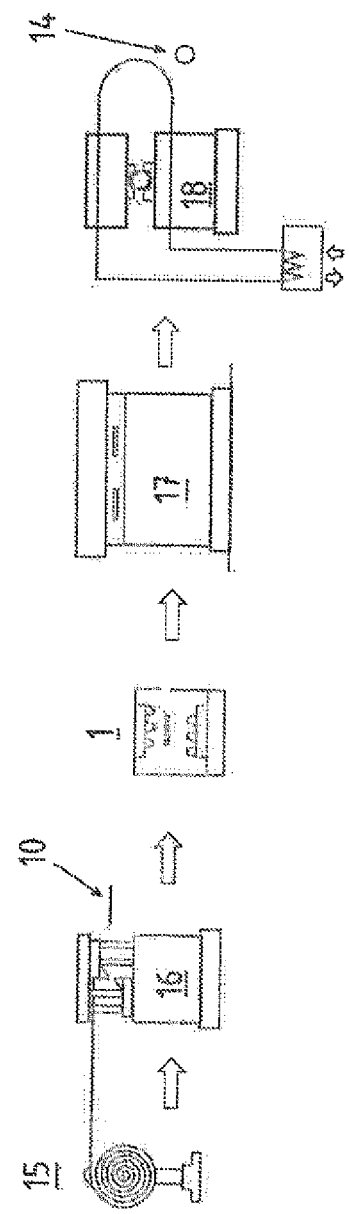

FIG. 5 shows an embodiment of the method according to the invention as flow chart. Sheet metal blanks 10 are cut from a sheet metal strip 15 and are subsequently heated in the heating station 1 to a target temperature. Subsequently, in an intermediate step, the heated blank is moved into a short continuous furnace 17 and homogenized. After this, the hot forming occurs in a cooled press forming tool 18. Thus the finished structure or chassis component 14 is generated.

Figure 6:
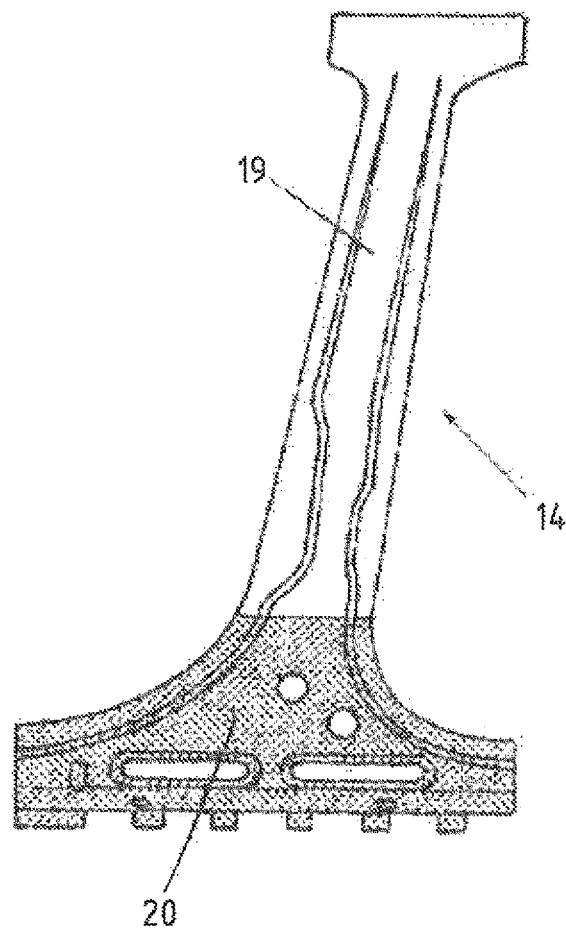

FIG. 6 shows a structural component according to an embodiment of the invention. Concretely, a B-column for a vehicle is shown, which B-column has a first region 19 and a second region 20. After completion of the method, the second region is softer than the first region in order to enable a sufficient deformation without crack formation or fracture of the component in the case of a side impact accident. The first region 19 of the sheet metal blank corresponds to the most degree to the here shown first region 19' of the finished component 14, however with cut away and/or bent border regions and opening burrs.

What is claimed is:

1. A method for producing structural or chassis components for a motor vehicle by hot or warm forming, comprising:
   providing a heating station comprising at least one burner zone, said at least one burner zone comprising at least one burner;
   operating the at least one burner with a combustible gas and an oxygen containing gas to thereby generate a burner flame;
   heating at least a first region of a sheet metal blank in the at least one burner zone from a starting temperature to a target temperature by bringing the sheet metal blank into direct contact with the burner flame generated by the burner;
   heating an aluminum silicone pre-coated sheet metal blank in the heating station to a temperature smaller than Ac3 until pre-alloyed; and
   heating the sheet metal blank in a furnace arranged downstream of the heating station to a temperature greater than Ac3 until completely austenized and alloyed through;
   transferring the heated sheet metal blank into a cooled pressing tool; and
   forming and press hardening the sheet metal blank in the cooled pressing tool to a finished component;
   wherein during the heating in the heating station at the same time at least a partial alloy layer is formed on the surface of the sheet metal blank, thereby an aluminum silicone layer transforms from inside to outside into an intermetallic iron aluminum silicone layer due to diffusion process,
   wherein an oxygen content of the oxygen-containing gas is greater than 90%, and wherein oxygen atoms not reacted during the combustion counteract a hydrogen embrittling in a heat influence zone, the hydrogen embrittling counteracted by a temperature profile with a heating rate of greater than 70K/s.

2. The method of claim 1, wherein the target temperature causes a complete austenization of the first region of the sheet metal blank.

3. The method of claim 1, further comprising heating a second region of the sheet metal blank to a temperature below Ac3, to thereby avoid a complete austenization of a basic material of the sheet metal blank in the second region and to enable a sufficient forming of the sheet metal blank in the cooled pressing tool, wherein a bainitic or ferritic microstructure and/or a mixed microstructure forms in the second region of the finished component.

4. The method of claim 1, wherein the heating to the target temperature in the heating station is influenced via an orientation of a nozzle of the at least one burner and/or a distance of the nozzle to the sheet metal blank.

5. The method of the claim 1, wherein the first region is heated to the target temperature with a rate of greater than 90K/s.

6. The method of claim 1, wherein the first region is heated in the heating station to less than Ac3 of a starting material of the sheet metal blank and for complete austenization and homogenization of a microstructure, the sheet metal blank is subsequently heated in a furnace to a temperature above Ac3 and is held at the temperature above Ac3 for a period of time of less than 90 s.

7. The method of the claim 1, wherein the heating rate occurs in a temperature range between 600 and 800° C.

8. The method of claim 1, wherein the structural or chassis component has a ductility which is higher by 5% with same strength, compared to a component of same construction which was heated over 4 minutes in a conventional continuous furnace and completely austenized.

9. The method of claim 1, wherein the structural or chassis component has a ductility which is higher by at least 10% with same strength, compared to a component of same construction which was heated over 4 minutes in a conventional continuous furnace and completely austenized.

* * * * *